United States Patent Office 3,442,640
Patented May 6, 1969

3,442,640
METHODS OF DESTROYING WEEDS WITH SUBSTITUTED TETRALINS
Thomas F. Wood, Wayne, N.J., and Nancy E. Achuff, Oreland, Pa., assignors, by direct and mesne assignments, to Givaudan Corporation, Clifton, N.J., a corporation of New Jersey
No Drawing. Filed Nov. 22, 1966, Ser. No. 596,066
Int. Cl. A01n 9/20
U.S. Cl. 71—124    6 Claims

ABSTRACT OF THE DISCLOSURE

The use as herbicides is disclosed of compounds having the formula:

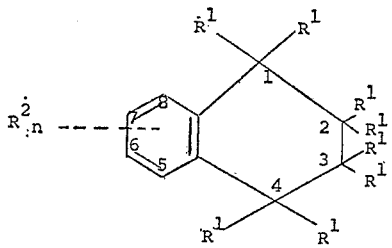

wherein $R^1$ is selected from the group consisting of hydrogen and alkyl radicals having from 1 to 5 total carbon atoms with the proviso that at least 2 of the $R^1$ radicals must be hydrogen; $R^2$ is selected from the group consisting of hydroxy, nitro, the alkoxymethyl radical and alkyl and alkoxy radicals having from 1 to 5 total carbon atoms and $n$ is an integer of 1 to 3; with the proviso that when $R^2$ is nitro, there must be 2 such groups with the nitro groups meta to each other, $R^2$ may also be an alkyl group, and both $R^1$'s in the 4 position must then be hydrogen.

---

This invention relates to the use of certain compounds for the purpose of controlling weeds. More particularly, this invention relates to the herbicidal use of polyalkyltetralin derivatives of the formula:

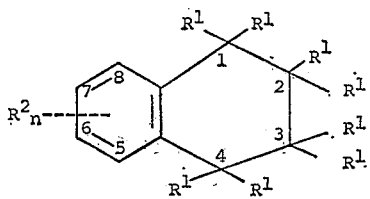

wherein $R^1$ is selected from the group consisting of hydrogen and alkyl radicals having from 1 to 5 total carbon atoms with the proviso that at least 2 of the $R^1$ radicals must be hydrogen; $R^2$ is selected from the group consisting of hydroxy, nitro, the alkoxy-methyl radical and alkyl and alkoxy radicals having from 1 to 5 total carbon atoms and $n$ is an integer of 1 to 3; with the proviso that when $R^2$ is nitro, there must be 2 such groups with the nitro groups meta to each other, $R^2$ may also be an alkyl group and both $R^1$'s in the 4 position must then be hydrogen.

The polyalkyltetralin compounds of the present invention have been found to possess high levels of herbicidal activity and to be useful in controlling undesirable plants of both monocotyledonous and dicotyledonous species by application to the locus to be protected, on a pre-emergence or a post-emergence basis. It has also been discovered that the compounds of the invention possess high rates of herbicidal activity on both emerged and submerged aquatic weed species.

The term "pre-emergence" as used herein means that the compounds are applied to the soil prior to emergence of the weed species sought to be controlled. This term, as used herein, also means the application of the herbicidal compound falling within the scope of this disclosure to areas wherein useful or desirable plants are either growing or have been sown, but wherein the undesirable plants sought to be controlled have not as yet emerged.

The term "post-emergence" means that the compounds are applied to plants sought to be controlled after their emergence from the soil surface. This term is used to describe the application of herbicidally active compounds to soil surface in and around growing plants sought to be controlled for purposes of effecting root absorption by the undesirable plant species.

In order to illustrate the herbicidal activity of the compounds falling under the purview of this invention there is presented below a series of test results which are reported solely by way of illustration and are not in any way intended to be construed as a limitation of this invention.

Seeds of at least two types of common weed varieties from the class of wild oats (*Avena fatua*), cheatgrass (*Bromus secalinus*), foxtail (*Setaria faberii*), barnyard grass (*Echinochloa crusgalli*), crabgrass (*Digitaria ischaemum*), nut grass (*Cyperus esculentus*), Johnson grass (*Sorghum halepense*), curled dock (*Rumex crispus*), yellow rocket (*Barbarea vulgaris*), chickweed (*Stellaria media*), pigweed (*Amaranthus retroflexus*), velvet leaf (*Abutilon theophrasti*) and lambsquarter (*Chenopodium album*) were planted in soil under greenhouse conditions. Immediately after planting, the soil surface was sprayed with aqueous solutions or suspensions of these compounds so as to apply the equivalent of 16 lbs. of the compound under test per acre of soil surface. The aqueous solutions or suspensions were produced by stirring acetone and/or alcohol solutions of these compounds into water. Three weeks after spray application the herbicidal activity of these compounds was determined in comparison with untreated control areas. The observed activity is reported in the following table wherein the average activity rating on two or more of the weed varieties included in the tests is reported as the percent control of growth.

TABLE

| Example No. | Compound | Percent total control of weeds |
|---|---|---|
| 1 | Check | 0 |
| 2 | 6-sec-butyl-7-methoxy-1,1,4,4-tetramethyl-1,2,3,4-tetrahydronaphthalene. | 90 |
| 3 | 5,7-dimethoxy-1,1,4,4-tetramethyl-1,2,3,4-tetrahydronaphthalene. | 100 |
| 4 | 6,7-dimethoxy-1,1,4,4-tetramethyl-1,2,3,4-tetrahydronaphthalene. | 100 |
| 5 | 1,1-dimethyl-5,7-dinitro-6-ethyl-1,2,3,4-tetrahydronaphthalene. | 95 |
| 6 | 1,1-dimethyl-5,7-dinitro-1,2,3,4-tetrahydronaphthalene. | 100 |
| 7 | 5,7-dinitro-1,1,6-trimethyl-1,2,3,4-tetrahydronaphthalene. | 100 |
| 8 | 6-ethoxy-1,1,4,4-tetramethyl-1,2,3,4-tetrahydronaphthalene. | 75 |
| 9 | 7-ethyl-1,1,3,4,4,6-hexamethyl-1,2,3,4-tetrahydronaphthalene. | 100 |
| 10 | 6-ethyl-7-methoxymethyl-1,1,4,4-tetramethyl-1,2,3,4-tetrahydronaphthalene. | 100 |
| 11 | 1,1,4,4,5,7-hexamethyl-6-methoxy-1,2,3,4-tetrahydronaphthalene. | 100 |
| 12 | 6-isopropyl-7-methoxy-1,1,4,4-tetramethyl-1,2,3,4-tetrahydronaphthalene. | 100 |
| 13 | 3-isopropyl-5,5,8,8-tetramethyl-5,6,7,8-tetrahydro-2-naphthol. | 100 |
| 14 | 6-methoxymethyl-1,1,4,4,7-pentamethyl-1,2,3,4-tetrahydronaphthalene. | 100 |
| 15 | 5-methoxy-1,1,4,4,7-pentamethyl-1,2,3,4-tetrahydronaphthalene. | 100 |
| 16 | 6-methoxy-1,1,4,4,7-pentamethyl-1,1,2,3,4-tetrahydronaphthalene. | 100 |
| 17 | 8-methoxy-1,1,4,4,5-pentamethyl-1,1,2,3,4-tetrahydronaphthalene. | 100 |
| 18 | 3,5,5,8,8-pentamethyl-5,6,7,8-tetrahydro-2-naphthol. | 90 |
| 19 | 4,5,5,8,8-pentamethyl-5,6,7,8-tetrahydro-1-naphthol. | 90 |
| 20 | 4,5,5,8,8-pentamethyl-5,6,7,8-tetrahydro-2-naphthol. | 100 |

For practical use as herbicides, the compounds of this invention may be formulated with conventional agricultural carriers to obtain the desired concentration and to facilitate handling. For example, these compounds may be formulated into dusts by combining them with such materials as talc or clays. Wettable powder formulations may be obtained by adding a dispersing or suspending agent to the dust formulations referred to above.

If desired, the compounds of this invention may be applied as spray solutions which can be prepared by dissolving the compounds in suitable solvents, such as water, xylene, methylated naphthalenes, kerosenes, common agricultural oils, etc. in accordance with well established agricultural practices. The choice of solvent to be used will be dictated by the solubility of the compound sought to be sprayed in that particular solvent system. Generally, it has been found that most of these compounds have a relatively low order of water solubility, so that the use of common agricultural organic solvents is the preferred practice.

The compounds of this invention may also be emulsified or suspended in water by adding wetting agents or emulsifying agents to aqueous systems containing one or more of the chemical compounds falling under this disclosure. These emulsified formulations are suitable for use in spraying directly upon the locus sought to be protected from undesirable vegetation. So far as has been determined no significant difference in effect is realized from the use of aqueous emulsified formulations or from organic solvent solutions of these herbicides, providing, of course, that a similar amount of chemical is employed in each instance of use.

So far as concerns the amount of herbicide to be used, this is, of course, subject to such considerations as the type of treatment to be made, the area to be treated, the type of weeds sought to be controlled and the stage of development of the species being sprayed. Generally, however, concentrated herbicidal compositions of the present invention are prepared so as to contain from about 5 to about 60% of the active herbicidal component. Compositions which are suitable for "as is" application generally contain from 0.1% to about 10% of active herbicidal component.

As a further illustration of the herbicidal activity of the compounds of this invention there are presented below additional test results obtained from utilization of these compounds in the eradication of both terrestrial and aquatic weeds.

EXAMPLE 21

An area freshly seeded with corn (Zea maize) and soybeans (Glycine max) was sown to cheatgrass (Bromus secalinus) and crabgrass (Digitaria ischaemum), and was then sprayed with an aqueous-acetone solution of the compound 7-ethyl-1,1,3,4,4,6-hexamethyl-1,2,3,4-tetrahydronaphthalene so as to apply a rate equivalent to 16 lbs./acre. At the time of spraying there was no plant growth in the treated area. Four weeks after spraying an inspection of the test area showed no noticeable injury to any of the economic crops, but complete or 100% control over the grasses.

EXAMPLE 22

The compound 1,1-dimethyl-6-ethyl-5,7-dinitro-1,2,3,4-tetrahydronaphthalene was sprayed at a rate equivalent to 16 lbs./acre, using an aqueous-alcohol solution, to an area freshly planted to snapbeans (Phaseolus vulgaris), soybeans (Glycine max), crabgrass (Digitaria ischaemum) and lambsquarter (Chenopodium album). At the time of spraying there was no noticeable plant growth in the test area. Four weeks following spraying an inspection of the treated area showed no noticeable injury to the economic crops, but 90% control over the undesirable plant species.

EXAMPLE 23

A post emergence application of the compound 1,4,5,5,8,8-hexamethyl-5,6,7,8-tetrahydro-2-naphthol was made at a rate equivalent to 8 lbs./acre wherein there was growing corn (Zea maize), yellow rocket (Barbarea vulgaris) and pigweed (Amaranthus retroflexus). Application was made using aqueous-alcohol solutions of the active herbicide agent. Approximately two weeks after treatment an inspection of the treated area showed that from 90 to 100% control was being obtained on the weed species but that essentially no injury occurred to the economic crops.

If it is desired to effect substantially complete elimination of vegetation through use of one or more compounds of this invention, it is then necessary to apply a higher rate of the chemical agent, for example from 20 to 40 lbs./acre thereof, so as to obtain total vegetation control.

Effective aquatic weed control can be accomplished by very low concentrations of the herbicidally active compounds of the present invention as is demonstrated by the following results.

EXAMPLE 24

A rate of 10 parts of 1,4-dimethyl-1-ethyl-1,2,3,5-tetrahydronaphthalene was added to each million parts of water wherein there was growing submerged aquatic weeds of the elodea species (Elodea canadensis). Three weeks after adding this compound to the water an inspection revealed that 100% control was obtained over this aquatic weed as compared with the control of untreated tests.

EXAMPLE 25

Each of the following compounds was separately added to water plots at a rate of 10 parts thereof to each million parts of water wherein there was growing emerged aquatic weeds of the water fern species (Salvinia rotundifolia).

(A) 1,1-dimethyl-6-ethyl-1,2,3,4-tetrahydronaphthalene
(B) 1,4-dimethyl-1-ethyl-1,2,3,4-tetrahydronaphthalene
(C) 3-isopropyl-5,5,8,8-tetramethyl-5,6,7,8-tetrahydro-2-naphthol
(D) 3,5,5,8,8-pentamethyl-5,6,7,8-tetrahydro-2-naphthol
(E) 4,5,5,8,8-pentamethyl-5,6,7,8-tetrahydro-2-naphthol
(F) 1,1,4,4-tetramethyl-1,2,3,4-tetrahydronaphthalene
(G) 5,5,8,8-tetramethyl-5,6,7,8-tetrahydro-2-naphthol
(H) 1,4,6-trimethyl-1,2,3,4-tetrahydronaphthalene
(I) 1,1,6-trimethyl-1,2,3,4-tetrahydronaphthalene
(J) 1,1,7-trimethyl-1,2,3,4-tetrahydronaphthalene Three weeks after introducing these compounds to the separate water plots, an inspection revealed that 100% control was being obtained over this floating aquatic weed species as compared with control or untreated plots.

EXAMPLE 26

Each of the following compounds was separately added to water plots at a rate of 10 parts thereof to each million parts of water wherein there was growing floating aquatic plants of the common duckweed variety (Lemna minor).

(A) 3-isopropyl-5,5,8,8-tetramethyl-5,6,7,8-tetrahydro-2-naphthol
(B) 4,5,5,8,8-pentamethyl-5,6,7,8-tetrahydro-1-naphthol
(C) 4,5,5,8,8-pentamethyl-5,6,7,8-tetrahydro-2-naphthol Approximately three weeks after adding these compounds to the separate water plots an inspection revealed 100% control was being obtained over this aquatic weed species as compared with the control of untreated plots.

Compounds found to be suitable for use in the present invention may be prepared by alkylation procedures such as described by Bruson et al. in J. Am. Chem. Soc., 62, 36 (1940); U.S. Patent 2,198,374, and by Wood et al. in J. Org. Chem. 28, 2251 (1963), and by Houlihan in French Patent 1,346,184.

These polyalkyltetralin compounds are colorless solids or colorless to pale yellow liquids which have low vapor pressure, boiling mainly within the range of 100–175° C. at 2 mm., and have good solubility in organic solvents.

In order to illustrate typical preparations of compounds of the present invention there are presented below several detailed examples of the preparation of the specific compounds which have been shown above to possess desirable herbicidal activity.

All temperatures are given in degrees centigrade. All melting points and boiling points are uncorrected. Infrared spectra were run on a Perkin Elmer Model 21 Infrared Spectrophotometer.

EXAMPLE 27

6-sec-butyl-7-methoxy-1,1,4,4-tetramethyl-1,2,3,4-tetrahydronaphthalene

Three grams of anhydrous aluminum chloride was added to a solution of 90 g. (0.55 mole) of o-sec-butyl-anisole [Chem. Abstr. 54, 7609 (1960)] in 75 g. of ethylene dichloride. To this was added a solution of 46 g. of 2,5-dichloro-2,5-dimethylhexane in 50 g. of ethylene dichloride over a 40 min. period with good agitation while the reaction temperature stayed near 27°. After the addition the reaction mixture was warmed to 35° and maintained at 35° to 37° for 30 min. The batch was then quenched in 250 ml. of water and the resulting oil layer successively washed with 300 ml. of water, 300 ml. of 10% sodium carbonate solution, filtered and distilled. After recovery of the ethylene dichloride the desired product was obtained as a colorless viscous liquid, B.P. 122° (2 mm.), $n_D^{20}$ 1.5125, amounting to 64 g. (92.5% of theory). The infrared spectrum of this material shows the following characteristic bands (0.025 mm. cell): 3.42 s., 6.61 m., 6.36 w., 6.64 s., 6.83 s., 7.16 ms., 7.33 ms., 7.75 m., 7.84 m., 8.07 s., 8.27 m., 8.40 w., 8.55 s., 8.92 ms., 9.23 w., 9.47 s., 9.80 mw., 9.98 w., 10.63–10.70 w., 11.17 s., 11.75 s., 12.93 m., 13.49 mw. microns.

EXAMPLE 28

5,7-dimethoxy-1,1,4,4-tetramethyl-1,2,3,4-tetrahydronaphthalene (The compound of Example 3, Table I)

A solution of 91.5 g. (0.5 mole) of 2,5-dichloro-2,5-dimethylhexane in 150 g. of ethylene dichloride was added with stirring to a mixture of 138 g. (1 mole) of 1,3-dimethoxybenzene (resorcinol dimethyl ether), 10 g. of aluminum chloride and 100 g. of ethylene dichloride. No hydrogen chloride was evolved, even after the addition was completed. The temperature was raised to 40°. Still there was no gas evolution. A 10 g. portion of aluminum chloride was again added whereupon the temperature rose to 50° and HCl came off vigorously for a short time. More AlCl₃ was added periodically to a total of 67 g. (0.5 mole). Very little HCl evolution took place near the end of the addition, although each addition caused a slight rise in temperature. The solution was quenched on ice. The ethylene dichloride solution was washed with water, dilute sodium hydroxide solution, water to neutrality, and distilled. After recovery of 65 g. of 1,3-dimethoxybenzene (B.P. 90° at 10 mm.) there was obtained 113 g. (91% of theory) of the desired product as a fraction boiling at 118–119° (1.5 mm.), $n_D^{20}$ 1.5264. This became crystalline on standing. After crystallization from ethanol the product was obtained as a colorless, odorless, solid, M.P. 39–40°.

Characteristic infrared absorption bands (0.025 mm. cell) are as follows: 3.503 s., 6.25–6.37 s., 6.93 s., 7.13 ms., 7.27 m., 7.40 m., 7.55 s., 7.65 s., 7.82 s., 7.90 s., 8.00 s., 8.28–8.40 s., 8.66–8.78 s., 9.15 s., 9.45–9.60 s., 10.65 ms., 11.20 w., 11.38 w., 11.83 m., 12.05 s., 12.40 m., 13.13 m., 14.90 mw. microns.

EXAMPLE 29

6,7-dimethoxy-1,1,4,4-tetramethyl-1,2,3,4-tetrahydronaphthalene

A solution of 91.5 g. (0.5 mole) of 2,5-dichloro-2,5-dimethylhexane in 150 g. of ethylene dichloride was added in part with agitation to a mixture of 76 g. (0.55 mole) of veratrol (o-dimethoxybenzene), 5 g. anhydrous aluminum chloride, and 100 g. of ethylene dichloride at room temperature. Hydrogen chloride evolution did not commence promptly. Ten grams more of aluminum chloride was added. The temperature rose to 40° and hydrogen chloride began to come off (not too rapidly). Hydrogen chloride continued to come off during the remainder of the addition (20 min. addition time). The temperature was held at 40–50° for 2.5 hrs. longer until evolution of HCl had nearly ceased. The mixture was then cooled and quenched in ice-water. The ethylene dichloride layer was washed successively with water, 5% sodium hydroxide solution and water again to neutrality. The mixture was vacuum-distilled. After recovery of 27 g. of 2,5-dichloro-2,5-dimethylhexane, B.P. 102–105° (20 mm.) there was obtained 83 g. of the desired product, B.P. 114–117 (1.5 mm.), melting at 65 to 75°. This was recrystallized from 45 g. of ethanol yielding 68 g. of colorless, odorless material, M.P. 75.5–77°.

*Analysis.*—Calcd. for $C_{16}H_{24}O_2$: C, 77.37; H, 9.74. Found: C, 77.37; H, 9.64.

This product's infrared spectrum shows the following characteristic bands (melt in demountable cell): 3.47 s., 6.24 mw., 6.68 s., 6.88 s., 7.24 mw., 7.38 mw., 7.50 mw., 7.61 m., 7.98 s., 8.26 s., 8.61 s., 9.28 w., 9.47 s., 9.74 ms., 10.28 mw., 10.67 w., 11.35 mw., 11.68–11.80 ms., 12.80 ms. microns.

EXAMPLE 30

6-ethoxy-1,1,4,4-tetramethyl-1,2,3,4-tetrahydronaphthalene

A solution of 91.5 g. (0.5 mole) of 2,5-dichloro-2,5-dimethylhexane in 100 g. of ethylene dichloride was added with agitation to a mixture of 70 g. (0.573 mole) of phenetole (ethoxybenzene), 5 g. of anhydrous aluminum chloride, and 100 g. of ethylene dichloride over a period of 25 min. at 16°. The solution was then stirred and allowed to warm to 25° over a period of 1.5 hr. The batch was quenched in water, washed with 5% sodium hydroxide solution and then with water to neutrality. After removal of the ethylene dichloride by distillation, the remaining oil was vacuum-distilled to yield 6-ethoxy-1,1,4,4-tetramethyl-1,2,3,4-tetrahydronaphthalene, a colorless, odorless, liquid, B.P. 105–106° (1 mm.), amounting to 107 g. (92.3% of theory). The product which solidified on standing was purified by crystallization from methanol yielding a colorless solid, M.P. 31.7° to 32°. Its infrared spectrum shows the following characteristic bands (0.025 cell): 3.48 s., 6.24 s., 6.39 m., 6.73–6.82–6.89 s., 7.25 s., 7.38 m., 7.63 m., 7.78 s., 8.15 s., 8.47 m., 8.98 m., 9.08 w., 9.22 w., 9.40 ms., 9.62 s., 10.40 mw., 10.57 m., 10.51 ms., 10.73 w., 12.25 m., 12.47 ms., 13.04 ms., 13.51 m., 14.51 m. microns.

EXAMPLE 31

7-ethyl-1,1,3,4,4,6-hexamethyl-1,2,3,4-tetrahydronaphthalene

A mixture of 150 g. (0.5 mole) of 7-acetyl-1,1,3,4,4,6-hexamethyl-1,2,3,4-tetrahydronaphthalene (T. F. Wood et al., J. Org. Chem. 28, 2248 (1963)), 800 g. of diethylene glycol, 71 g. 85% hydrazine, and 50 g. of sodium hydroxide was stirred and refluxed (at 148°) for one hour. Then refluxing and stirring was continued with separation of water until the pot temperature reached 204°. This required three hours longer. The batch was cooled, treated with 125 g. of 37% hydrochloric acid, and then quenched by addition of 500 ml. of water with stirring. The resulting aqueous layer was extracted with benzene which was then combined with the oil layer. The resulting solution was washed with hot water. After removal of the benzene by distillation, the remaining oil was vacuum distilled. The product, boiling at 118° (2 mm.), amounted to 124 g. (86.6% of theory). The melting point of the distilled product was 33°. Its infrared spectrum shows the following characteristic bands (melt in demountable cell): 3.42 s., 6.63 s., 6.86 s., 7.16 s., 7.27 m., 7.32 s., 7.74 w., 7.85 m., 7.97 mw., 8.17 mw., 8.35 w., 8.66 mw., 8.75 m., 8.94 mw., 9.17 w., 9.40 m., 9.65–9.68 mw., 9.82 w., 10.05 mw., 10.19 w., 10.53 w., 10.75 w., 10.98 w., 11.25 s., 11.37 m., 11.80 mw., 12.57 w., 12.73 w., 15.05 mw. microns.

EXAMPLE 32

6-ethyl-7-methoxymethyl-1,1,4,4-tetramethyl-1,2,3,4-tetrahydronaphthalene

A mixture of 7-chloromethyl-6-ethyl-1,1,4,4-tetramethyl-1,2,3,4-tetrahydronaphthalene (44 g.) (U.S. Patent 2,800,511, Example 2) and 10.5 g. of sodium methylate disolved in 50 g. of methanol was gently refluxed (65°) for ninety min. Sodium chloride precipitated. The batch was cooled, diluted with 150 ml. water and the resulting oil layer separated. The aqueous layer was extracted with 110 ml. of benzene which was then combined with the oil. This solution was washed to neutrality and, after removal of the benzene, was vacuum-distilled, yielding 40 g., B.P. 116° (1.5 mm.), $n_D^{20}$ 1.5172, which was the desired ether. This was a colorless, odorless, chlorine-free oil. The infrared spectrum of this material shows the following characteristic bands (0.025 mm. cell): 3.50 s., 6.21 w., 6.71 ms., 6.87 s., 7.20 m., 7.27 ms., 7.37 s., 7.50 w., 7.80 w., 7.95 mw., 8.17 mw., 8.44 s., 8.73 mw., 9.00–9.15–9.22 s., 9.45 mw., 9.57 mw., 9.82 w., 9.90 w., 10.48 m., 10.75 w., 10.97 w., 11.26 s. and 11.87 w. microns.

EXAMPLE 33

1,1,4,4,5,7-hexamethyl-6-methoxy-1,2,3,4-tetrahydronaphthalene

Ninety-one grams of 2,5-dichloro-2,5-dimethylhexane dissolved in 100 g. of ethylene dichloride was slowly fed into a solution of 68 g. of 2,6-dimethylanisole and 5 g. of anhydrous aluminum chloride in 70 g. of ethylene dichloride over a period of 30 min. while the reaction was held at 32°. The mixture was then brought to 45° and kept at this temperature for 3 hrs. and 20 min. The batch was cooled, quenched in water (200 ml.) washed neutral, and distilled. There was obtained 66 g. of 1,1,4,4,5,7-hexamethyl-6-methoxy-1,2,3,4-tetrahydronaphthalene, a colorless liquid, B.P. 121–123° (2 mm.), $n_D^{20}$ 1.5270 (53.5% of theory). Its infrared spectrum has the following characteristic bands (0.025 mm. cell): 3.50 s., 6.88 s., 7.21 m., 7.35 m., 7.65 s., 7.96 s., 8.30 s., 8.62 s., 8.86 m., 9.25 m., 9.63 s., 9.98 m., 10.20 mw., 11.44 m., 11.81 w., 12.50 w., 12.86 mw., 13.55 mw., 15.06 w. microns.

EXAMPLE 34

3-isopropyl-5,5,8,8-tetramethyl-5,6,7,8-tetrahydro-2-naphthol

A solution of 91.5 g. (0.5 mole) of 2,5-dichloro-2,5-dimethylhexane in 100 g. of ethylene dichloride was slowly fed into a mixture of 63 g. (0.463 mole) of o-isopropylphenol (Ethyl Corporation), 100 g. of ethylene dichloride, and 5 g. anhydrous aluminum chloride over a one hour period at 25–30° with good agitation. The reaction was then warmed to 45° for 10 min. Evolution of HCl was observed throughout the reaction. The batch was then quenched on 50 g. cold water, washed twice with 200 ml. of warm water to neutrality. After evaporation of the solvent the residual liquid was vacuum-distilled yielding 77 g. of desired product, a yellow, viscous liquid. Analysis by vapor-phase chromatography showed a purity of 99%. Its infrared spectrum shows the following characteristic absorption bands (0.025 mm. cell): 2.98 s., 3.45 s., 6.16 m.,6.35 m., 6.65 s., 6.85 s., 7.11 s., 7.22 ms., 7.34 s., 7.48 ms., 8.00 s., 840 s., 8.60 s., 8.95 s., 9.23 w., 9.33 m., 9.56 m., 9.81 w., 10.07 ms, 1053 w, 11.24 s., 11.60 m., 11.88 w., 12.83 s., 13.30 ms. microns.

EXAMPLE 35

6-isopropyl-7-methoxy-1,1,4,4-tetramethyl-1,2,3,4-tetrahydronaphthalene

A mixture of 123 g. of 3-isopropyl-5,5,8,8-tetramethyl-5,6,7,8-tetrahydro-2-naphthol (Compound 13 of Table I), 390 g. of toluene, and 60 g. of 50% sodium hydroxide was stirred and refluxed with separation of water until anhydrous (41 g. of water removed). Into the resulting suspension of anhydrous sodium phenolate derivative in toluene, at reflux temperature was added 41 g. of dimethyl sulfate over a 20 min. period with refluxing. After the addition the mixture was refluxed for three hours. The cooled mixture was treated with 250 g. of water to dissolve the separated salt. The solution which remained after separation and removal of the lower aqueous layer was washed to neutrality with water and distilled. The desired product, amounting to 121 g. (93% of theory), boiled at 118° (2 mm.) and solidified at room temperature. It melted at 38–39° after crystallization from ethanol.

Analysis.—Calcd. for $C_{18}H_{28}O$: C, 83.02; H, 10.84. Found: C, 82.84, H, 10.77.

The infrared spectrum of this material shows the following characteristic bands (melt in 0.0125 demountable cell): 3.47 s., 6.22 mw., 6.40 w., 6.69 m., 6.88 s., 7.20 m., 7.38 m., 7.49 m., 7.63 mw, 7.88 m., 8.08 s., 8.31 m., 8.44 w., 8.56 s., 8.92 m., 9.11 w., 9.25 w., 9.33 w., 9.50 s., 9.83 w., 10.25 w., 11.23 ms., 11.78 s., 12.96 mw. and 13.35 mw. microns.

EXAMPLE 36

6-methoxymethyl-1,1,4,4,7-pentamethyl-1,2,3,4-tetrahydronaphthalene

This material was prepared by a method similar to that for the compound of Example 32 starting from the corresponding chloromethyl compound, 7-chloromethyl-1,1,4,4,6-pentamethyl-1,2,3,4-tetrahydronaphthalene (U.S. Patent 2,800,500, Example 1, 2nd paragraph). It was obtained as a colorless, odorless, chlorine-free oil, B.P. 116° (2 mm.), $n_D^{20}$ 1.5194, which solidified on standing. It melted at 39–40° after two crystallizations from methanol. Its infrared spectrum shows the following characteristic bands (melt in a 0.0125 mm. demountable cell): 3.48 s., 6.73 mw., 6.92 ms., 7.27 mw., 7.38 m., 7.97 w., 8.21 w., 8.45 m., 8.71 w., 9.15 s., 9.60 w., 9.87 w., 10.10–10.15 w., 10.60 w., 10.94 w., and 11.34 m. microns

EXAMPLE 37

5-methoxy-1,1,4,4,7-pentametehyl-1,2,3,4-tetrahydronaphthalene

A solution of 183 g. (1 mole) of 2,5-dichloro-2,5-dimethylhexane in 200 g. of ethylene dichloride was added over a 50 min. period to a mixture of 122 g. (1 mole) of 3-methoxytoluene, 13 g. anhydrous aluminum chloride, and 124 g. of ethylene dichloride at 30 to 33° with good agitation. Smooth evolution of HCl was observed. After the feeding the reaction was brought to 45° and stirred for 45 min. The batch was then cooled, quenched in cold water (300 ml.), washed to neutrality with water and distilled. The desired compound was obtained as a colorless liquid, B.P. 97.5° (1 mm.), which soon solified after distillation. The yield was 210 g. (90.5% of theory). After recrystallization from ethanol it melted at 50 to 51.5°.

Analysis.—Calcd. for $C_{16}H_{24}O$: C, 82.70; H, 10.41. Found: C, 83.05; H, 10.12.

The infrared spectrum shows the following principal characteristic bands (0.015 mm. demountable cell): 3.48 s., 6.21 ms., 6.38 s., 6.80–6.92 s., 7.12 ms., 7.28 w., 7.38 m., 7.63 m., 7.88 s., 7.98 s., 8.28 w., 8.45 s., 8.73 m., 9.22 ms., 9.40 s., 9.54 m., 9.82 w., 10.29 w., 10.43 m., 11.23 w., 11.41 w., 11.61 mw., 12.08 s., 13.04 m. microns.

EXAMPLE 38

6-methoxy-1,1,4,4,7-pentamethyl-1,2,3,4-tetrahydronaphthalene

Following the general method of Example 37 above, o-cresyl methyl ether (2-methoxytoluene) was readily cyclialkylated to produce this derivative. However in this preparation the maximum reaction temperature was 38° instead of 45°. The product was obtained as a low melting solid, B.P. 102° (1.5 mm.), M.P. 33.5°, in a yield of 92.2% of theory. Its infrared spectrum shows the following characteristic bands (melt in 0.015 mm. demountable cell): 3.48 s., 6.23 m., 6.40–6.44 w., 6.73 ms., 6.88 s., 7.24 m., 7.39 m., 7.62 ms., 7.92 w., 8.06 s., 8.34 m., 8.67 s., 9.03 w., 9.27 w., 9.49 s., 9.60 m., 10.02 w., 10.21 w., 10.61 w., 11.36 ms., 11.82 ms., 12.88 mw., 12.99 mw. microns.

EXAMPLE 39

8-methoxy-1,1,4,4,5-pentamethyl-1,2,3,4-tetrahydronaphthalene

This compound was produced by the cyclialkylation of p-cresyl methyl ether (4-methoxytoluene) by the method described in Example 37 above. In this preparation the maximum reaction temperature was 40° and, since the reaction proceeded somewhat more slowly, the conversion was lower. The product was obtained as a colorless solid, B.P. 107–115° (1.5 mm.). After two crystallizations from ethanol the product was an odorless solid, M.P. 61–62°.

*Analysis.*—Calcd. for $C_{16}H_{24}O$: C, 82.70; H, 10.41. Found: C, 82.83; H, 10.17.

This compound shows the following principal characteristic bands (melt in 0.015 mm. demountable cell): 3.47 s., 6.23 m., 6.41 m., 6.93 s., 7.13 ms., 7.27 w., 7.39 w., 7.64 ms., 7.89 ms., 7.98 ms., 8.47 ms., 8.75 m., 9.23–9.29 s., 9.40 s., 10.46 w., 12.05 s., 13.03 w. microns in its infrared spectrum.

EXAMPLE 40

4,5,5,8,8-pentamethyl-5,6,7,8-tetrahydro-1-naphthol

A solution of 200 g. of 2.5-dichloro-2,5-dimethylhexane in 180 g. ethylene dichloride was slowly fed into a mixture of 125 g. of p-cresol, 9 g. of anhydrous aluminum chloride, and 100 g. of ethylene dichloride with good agitation over a period of 45 min. at 25 to 35°. The resulting mixture was stirred and warmed to 45° where stirring was continued for 30 min. The batch was quenched in 300 g. of ice-water, filtered and washed to neutrality. The ethylene dichloride was evaporated and the remaining liquid vacuum-distilled at 2 mms. to yield the desired product, a fraction, B.P. 130–136° (2 mm.), amounting to 79 g., which solidified after distillation. This was purified by crystallization from hexane (500 g.) yielding 52 g. of colorless solid, M.P. 100–101°.[1] Its infrared spectrum shows the following characteristic bands (0.025 mm. cell): 2.81 s., (OH group of phenol), 3.42 s., 6.29 ms., 6.85–6.88 s., 7.15 s., 7.27 m., 732 m., 7.47 w., 7.89 s., 8.03 mw., 8.30 m., 8.41 s., 8.50 s. 8.80 m., 8.94 w., 9.25 w., 9.41 mw., 9.93 w., 10.18 m., 10.60 ms., 12.02 m., 12.27 s., 12.76 mw., 13.78 w. microns.

The structure was further confirmed by analysis of its nuclear magnetic resonance spectrum.

EXAMPLE 41

1,4,5,5,8,8-hexamethyl-5,6,7,8-tetrahydro-2-naphthol

A solution of 149 g. of 2,5-dichloro-2,5-dimethylhexane (0.815 mole) in 165 g. of ethylene dichloride was added with agitation to a mixture of 100 g. of 2,5-dimethylphenol (p-xylenol), 8 g. of anhydrous aluminum chloride and 115 g. of ethylene dichloride with a reaction temperature of 23–28°. Addition was completed in 40 min. The batch was then warmed to 50° and allowed to stir overnight at this temperature. It was then quenched in 200 g. of ice-water. The oil which separated was washed with 150 ml. of 10% hydrochloric acid and then with 150 ml. of 10% sodium carbonate solution and distilled. The desired product was obtained as an orange-colored viscous liquid, B.P. 143–148° (2 min.), $n_D^{20}$ 1.5404, amounting to 80 g. (42% of theory). The infrared spectrum of this material shows the following characteristic bands (0.025 mm. cell): 2.95–3.98 s., 3.52 s., 6.30 s., 6.90 s., 7.26 s., 7.36 s., 7.67 s., 8.02 s., 8.47–8.57 s., 9.34 c., 9.75–9.85 s., 10.89 w., 11.13 w., 11.75–11.83 ms., 14.30 mw., microns.

The foregoing illustrates the practice of this invention, which, however, is not to be limited thereby, but is to be construed as broadly as permissible in view of the prior art and limited solely by the appended claims.

We claim:

1. A method for controlling weeds, which comprises applying to the locus to be protected, a herbicidally effective amount of a compound of the formula:

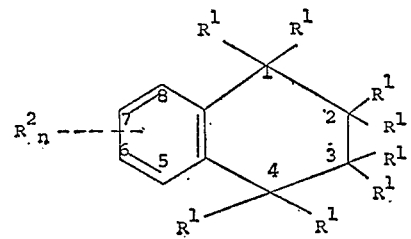

wherein $R^1$ is selected from the group consisting of hydrogen and alkyl radicals having from 1 to 5 total carbon atoms with the proviso that at least 2 of the $R^1$ radicals must be hydrogen; $R^2$ is selected from the group consisting of hydroxy, nitro, the alkoxy-methyl radical and alkyl and alkoxy radicals having from 1 to 5 total carbon atoms and $n$ is an integer of 1 to 3; with the proviso that wen $R^2$ is nitro, there must be 2 such groups with the nitro groups meta to each other, $R^2$ may also be an alkyl group, and both $R^1$'s in the 4 position must then be hydrogen.

2. The method of claim 1 wherein the compound is 6 - ethyl-7-methoxymethyl - 1,1,4,4 - tetramethyl-1,2,3,4-tetrahydronaphthalene.

3. The method of claim 1 wherein the compound is 6,7 - dimethoxy - 1,1,4,4-tetramethyl-1,2,3,4 - tetrahydronaphthalene.

4. The method of claim 1 wherein the compound is 6-isopropyl - 7-methoxy - 1,1,4,4 - tetramethyl-1,2,3,4-tetrahydronaphthalene.

5. The method of claim 1 wherein the compound is 5,7 - dimethoxy-1,1,4,4-tetramethyl - 1,2,3,4-tetrahydronaphthalene.

6. The method of claim 1 wherein the compound is 6-methoxymethyl-1,1,4,4,7 - pentamethyl - 1,2,3,4 - tetrahydronaphthalene.

References Cited

UNITED STATES PATENTS

| | | | |
|---|---|---|---|
| 2,396,513 | 3/1946 | Jones | 167—45 |
| 3,012,869 | 12/1961 | Ramey et al. | 71—125 |
| 3,257,190 | 6/1966 | Soper | 71—121 |
| 3,283,016 | 11/1966 | Wood et al. | 71—127 |
| 3,330,640 | 7/1967 | Luckenbaugh et al. | 71—92 |
| 3,352,662 | 11/1967 | Klopping et al. | 71—88 |

FOREIGN PATENTS

| | | |
|---|---|---|
| 1,346,184 | 11/1963 | France. |

(Other references on following page)

---
[1] This compound was previously prepared by Bruson and Kroeger, J. Am. Chem. Soc., 62, 36 (1940) who assigned a different structure.

OTHER REFERENCES

Bogert et al., J. Am. Chem. Soc. 56, 959–963 (1934).
Cogniant et al., cited in Chem. Abst. 38, 2332 (1944).
Grob et al., Helv. Chim. Acta 31, 1691, 1695, 1703 (1948).
Lewis et al., J. Chem. Soc. 1934, 1253–1255.
Makarov-Zemlyanskii et al., cited in Chem. Abst. 31, 6224 (1937).
Muller et al., cited in Chem. Abst. 45, 7991 (1951).
Wood et al., J. Org. Chem. 28, 2248–2255 (1963).

LEWIS GOTTS, *Primary Examiner.*

MELVYN M. KASSENOFF, *Assistant Examiner.*

U.S. Cl. X.R.

71—66, 122, 125, 127; 260—611, 612, 613, 619, 645, 668